United States Patent [19]

Littell, III

[11] Patent Number: 4,901,917
[45] Date of Patent: Feb. 20, 1990

[54] ANTICIPATING DUAL SET-POINT BISTABLE THERMOSTAT

[76] Inventor: Charles C. Littell, III, 3405 E. 5th St., Dayton, Ohio 45403

[21] Appl. No.: 328,652

[22] Filed: Mar. 21, 1989

[51] Int. Cl.$^4$ .............................................. F23N 5/20
[52] U.S. Cl. .................................... 236/46 R; 165/12
[58] Field of Search ................. 236/46 R, 47; 165/12; 364/557

[56] References Cited

U.S. PATENT DOCUMENTS

| | | | |
|---|---|---|---|
| 4,172,555 | 10/1979 | Levine | 236/46 R |
| 4,298,946 | 11/1981 | Hartsell et al. | 364/557 |
| 4,333,316 | 6/1982 | Stamp, Jr. et al. | 62/126 |
| 4,388,692 | 6/1983 | Jones et al. | 364/557 |
| 4,442,972 | 4/1984 | Sahay et al. | 236/1 EA |
| 4,645,908 | 2/1987 | Jones | 219/378 |
| 4,685,307 | 8/1987 | Jones | 62/160 |
| 4,799,176 | 1/1989 | Cacciatore | 364/557 |

Primary Examiner—William E. Wayner
Attorney, Agent, or Firm—Bernard E. Franz; Donald J. Singer

[57] ABSTRACT

Automatically adjusting the time when control is returned to the operational set-point, in compensation for changing load conditions, is accomplished by measuring the operation of a heating or cooling system controller in its standby mode, and using this measurement to calculate the advance time required to return the system to its operational temperature. The operational factor to be measured depends on the control system: with a bistable or on-off thermal source, such as a household furnace, measurement of the time required to heat the house the few degrees between the set-back on and off set-points will permit calculation of the time required to reheat the house to its operational temperature.

9 Claims, 3 Drawing Sheets

MID CYCLE RESET LOOP

ANTICIPATING DUAL SET-POINT BISTABLE THERMOSTAT

RIGHTS OF THE GOVERNMENT

The invention described herein may be manufactured and used by or for the Government of the United States for all governmental purposes without the payment of any royalty.

BACKGROUND OF THE INVENTION

The present invention relates generally to an anticipating dual set-point bistable thermostat.

Dual set-point thermostats commonly are manually programmed: the user selects the temperatures desired during operational normal and standby periods. In selecting the time to end the standby period, the user typically advances the setting to allow for temperature to readjust before being occupied. The disadvantage with such a situation is that the proper advancement varies with the thermal loading; sometimes the economical standby period is abandoned prematurely, while at other times the user reoccupies the space before it has completed its readjustment.

This problem is addressed in automated industrial "Energy Management Control Systems" (EMCS). Most EMCS's have provisions for automated dual set-point timing. These systems compute an estimate of the time required to return a zone from standby to operational temperatures using an array of meterological and environmental measurements, such as the outside wind speed, temperature, solar radiation, temperature of adjacent interior zones, etc. The disadvantages of this approach to automating dual set-point timing is the capital expense of the array of measurement instrumentation, the complexity and consequential expense of integrating the instrumentation to the EMCS, and the operational expense of calibrating and maintaining it.

U.S. Pat. No. 4,333,316 to Stamp et al discloses microprocessor based control apparatus for a heat pump system, which includes a standby mode having an expanded operating temperature range. U.S. Pat. Nos. 4,645,908 and 4,685,307 to Jones relate to energy management system for residential heating and cooling, for limiting electrical usage during peak times. U.S. Pat. No. 4,799,176 to Cacciatore discloses a programmable electronic digital thermostat which provides improved control of a temperature conditioning system for varying load conditions in order to maintain the ambient temperature within a predefined range of a scheduled set temperature while minimizing ambient temperature overshoots and undershoots. U.S. Pat. No. 4,298,946 to Hartsell discloses a programmable thermostat for maintaining desired temperatures during selected time periods and includes programmed instructions for measuring actual time rate of change of the ambient temperature during heating and cooling cycles to anticipate reaching the desired temperature. U.S. Pat. No. 4,388,692 to Jones discloses a similar thermostat further including programmed instructions for varying a threshold hysteresis temperature with time in discrete steps around the desired ambient temperature or set temperature. U.S. Pat. No. 4,442,972 to Sahay discloses a thermostat which includes programmed instructions for determining a restart time prior to the next scheduled time interval for initiating operation of the temperature conditioning system to achieve the next temperature at the scheduled time.

SUMMARY OF THE INVENTION

An objective of the invention is to provide an improvement which will maximize the amount of time that a dual set-point bistable thermostat can remain in its energy saving mode, and still dependably achieve operational temperatures on schedule.

The invention relates to apparatus for automatically adjusting the time when control is returned to the operational set-point, in compensation for changing load conditions. This is accomplished by measuring the operation of a heating or cooling system controller in its standby mode, and using this measurement to calculate the advance time required to return the system to its operational temperature. The operational factor to be measured depends on the control system: with a bistable or on-off thermal source, such as a household furnace, measurement of the time required to heat the house the few degrees between the set-back on and off set-points will permit calculation of the time required to reheat the house to its operational temperature. (A proportionate control system can perform the same calculation using a measurement of the controller output; such applications of the concept are to be addressed in a separate patent application.) Additional energy savings will result from the ability to set the energy saving mode temperature for maximum savings without significantly increasing the incidence of failure to reach operating mode temperatures on schedule. Prior state-of-the-art systems can only approach such performance with vastly greater capital expense and maintenance requirements.

A feature of the invention is the prediction of the time required to change the temperature of a space being heated or cooled, by measuring only the output of the existing thermostat, and without requiring additional sensors or significant additional complexity to the basic clock-controlled dual set-point thermostat. Besides the advantage of its simplicity, the fact that it functions on the sum of all system loading factors, i.e. the response of the space to the heating or cooling source itself, makes it inherently more accurate than those that function on estimates of the effects of individual loading factors (measured external wind speed, et al).

DETAILED DESCRIPTION

Figure 1:
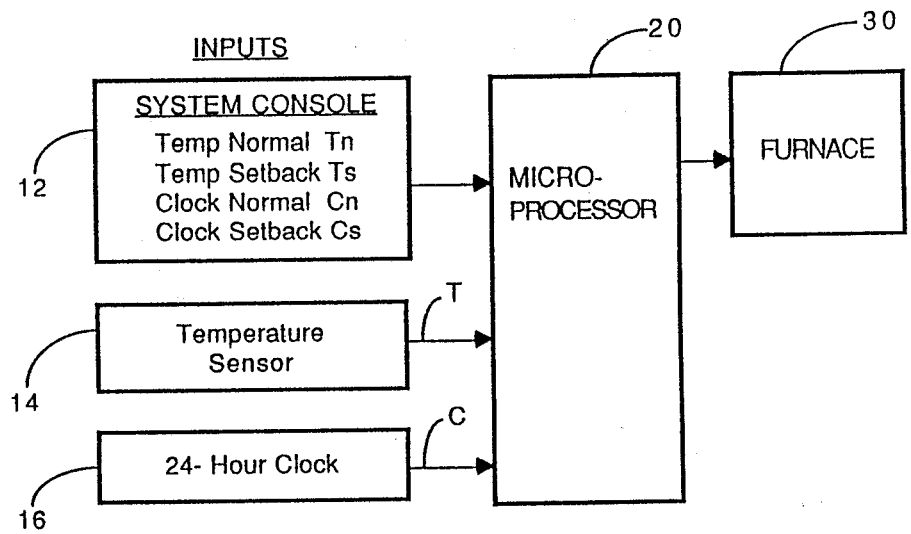
FIG. 1 is a block diagram showing a microprocessor controlled heating system.

A simple system block diagram of a typical household heating control system is shown in FIG. 1. Inputs to the system include a system console 12, a temperature sensor 14 and a 24-hour clock 16. Signals from these inputs are supplied to a microprocessor 20, which supplies on and off signals to a furnace 30. (A heating system with a furnace is used only as an example—other types of heating and/or cooling systems could also be used with the invention.) The console 12 is the primary manual input and display device that interfaces with the user and includes various desired input switches, display registers and associated logic circuits for manual entry of user-selected control data into the control apparatus of the invention. Console 12 is preferably located at a position within the heated space that enables the user to have convenient access thereto. The temperature sensor 14 is also located in the heated space. The microprocessor 20 would be a compact unit which could be located in the same unit as the console 12 and sensor 14, along with the clock 16.

As shown in FIG. 1, the system console 12 provides for the user to set the parameters for a normal temperature Tn, a setback temperature Ts, a clock setting Cn for start of normal operation, and a clock setting Cs for start of setback operation. In some systems there would also be a switch for selecting heating, cooling, fan or off. The temperature sensor 14 supplies a temperature T which would be converted from analog to digital form and stored in a register for reading by the microprocessor during operation. The clock 16 is preferably a digital form which provides the clock time C for reading by the microprocessor during operation. Temperatures Toff and Ton are values above and below the setback temperature Ts for furnace on and furnace off setpoints, and a value Td is the difference or temperature dwell between the off and on set-points. Whenever the temperature T equals Ton, a flag is set in a register whose output is used to send a signal to the furnace 30 to start heating. Whenever the temperature T equals Toff, a flag is set in the register whose output is used to send a signal to the furnace 30 to stop heating. These flags can also be read by the microprocessor during operation. (Although not shown on the drawing, there are also on and off values of temperature above and below the normal temperature setting Tn separated by the value Td, which are used to control the furnace but are not used in the process of FIG. 3.) There should also be a default value in a register for the parameter Cno for the Clock Normal Offset.

Figure 2:
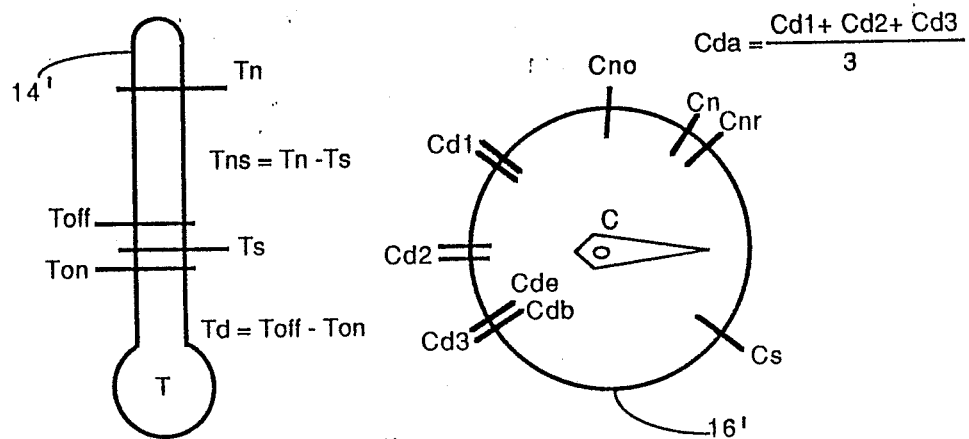
FIG. 2 is a symbolic diagram showing various parameters used in the microprocessor.

FIG. 2 is a symbolic diagram showing various parameters used in the microprocessor 20, which are defined in the following table.

| PROCESS CONTROL DEFINITIONS | |
|---|---|
| T = Temperature | C = Clock real time |
| Tn = Temperature Normal | Cn = Clock Normal: real time normal mode start setting |
| Ts = temperature setback | |
| Tns = range between Normal and Setback Temps. | Cno = Clock Normal Offset: real time advance required to achieve normal temp at Cn |
| Ton = Temp. furnace On setpoint | |
| Toff = Temp. furnace Off setpoint | Cnr = Clock Normal Reached: real time normal temp. achieved |
| Td = Temp. Dwell between setpoints | |
| Cs = Clock Setback: real time setback mode start setting | Ef = Error Ratio of Cno calculation |
| Cdb = Clock Dwell Begin: real | F = error compensation Factor time furnace cycles off during setback mode |
| R = system Reset | Cde = Clock Dwell End: real time furnace cycles off during setback mode |
| INPUTS REQUIRED AT RESET | |
| Cn, Cno, Cs, Tn and Ts | Cd1, Cd2, Cd3 = Clock Dwell 1/2/3: time between Cdb and Cde, three most recent completed cycles |
| Cd1, Cd2 and Cd3 will reset to value (Cn-Cno)/(Tns/Td); Cnr will reset to value Cn | |
| | Cda = Clock Dwell Average at Cnr |
| VALUE IN MEMORY (ROM) | |
| Td | Cdf1 = Clock Dwell Average at Cnr |
| | Cdf2 = Clock Dwell Average at most recent previous Cnr |

Figure 3:
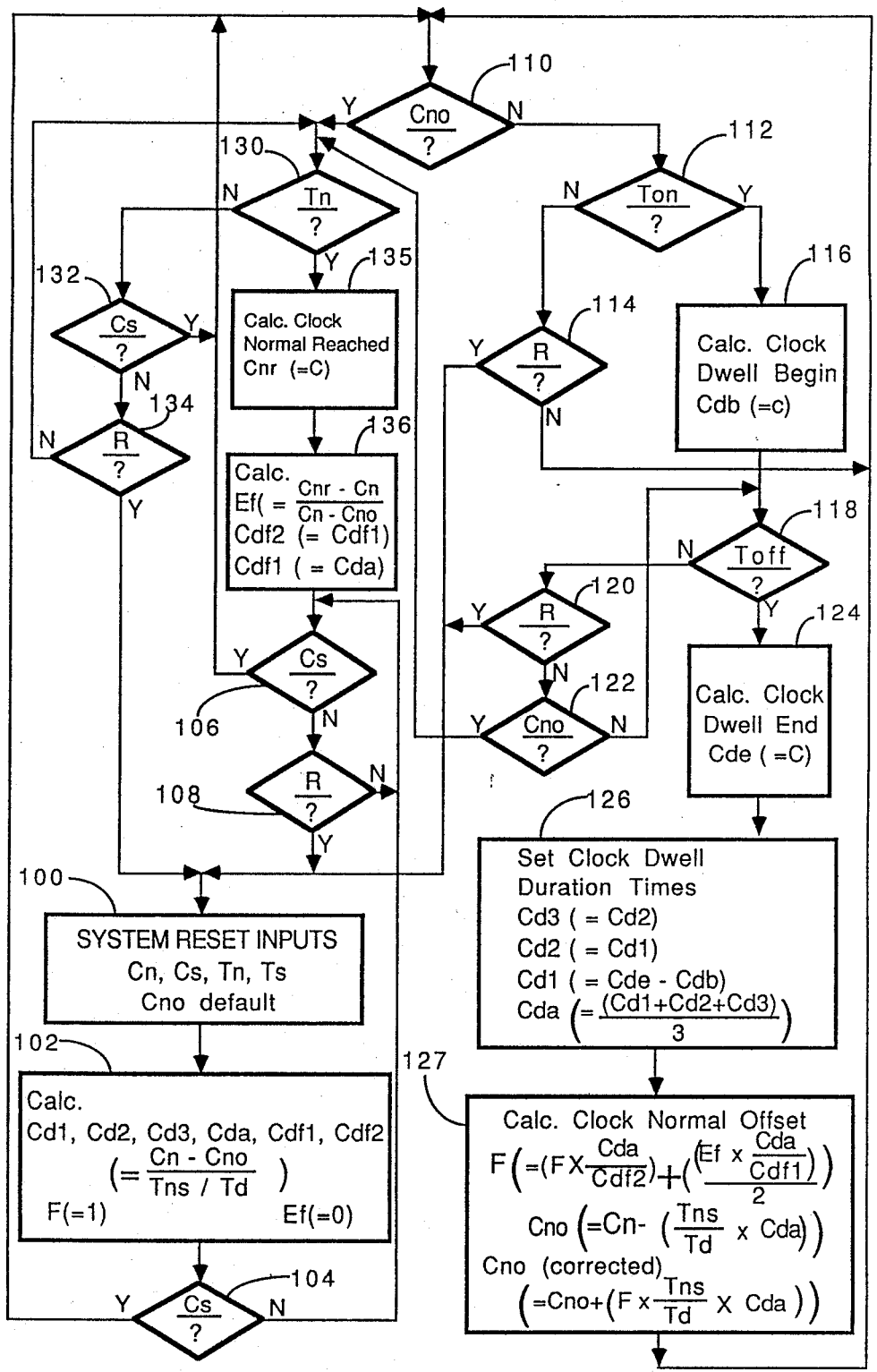
FIG. 3 is a process control flowchart.

In the above table and a process control flowchart in FIG. 3, a household furnace control time-setback thermostat process is shown, with the necessary additional process steps to automatically advance or retard the time at which control switches from setback to normal temperature set-points. All "T" designators refer to temperature measurements, except "Tns" and "Td" which are temperature ranges. All "C" designators refer to clock readings, except "Cd1/$\frac{2}{3}$", "Cdf$\frac{1}{2}$", and "Cda" which are calculated ranges of time. "F" is an error compensation factor, and "Ef" is a raw error ratio. The flowchart consists of event determinants and process calculations; the required steps to load clock and thermometer readings into appropriate registers, switch the furnace on and off, etc., are assumed. It should be noted that while a microprocessor-based embodiment is presumed, such a process could be rendered mechanically, using slip-clutch accumulators, etc. A system could also be developed by the use of a personal computer, hooked to a temperature sensor through an A/D port, controlling the operation of a heating or cooling system. This approach would also simultaneously permit data logging for analysis of performance.

Two non-essential elements are included in the process description. First, the averaging of the most recent thermostat dwells ("Cda") compensates for any instabilities in the thermal sensor due to convection currents, etc. Second, the error compensation factor "F" tends to correct for non-linearities in the heating system as a whole. It consists of one-half of the ratio of error from the most recent "Cno" calculation, normalized for the current "Cda". Variations of these and other non-essential elements can be used to refine the design for a given application; all such designs would, however, incorporate the novel concept of using the "Cd" measurements to drive the calculations.

Note that in the table of process control definitions, the "C" designators and the "T" designators refer to numerical values of time and temperature (or ranges), each of which will require a memory register of several bits for storage. In addition, the flow chart has several decision steps for checking status, which should be distinguished from the numerical values, and could be stored as flags in a status register with one bit for each status. The clock status is one of Cs, Cno or Cnr true, controlled by comparing the real clock time value C to the values temperature value T to the values Ton and Toff so that when T<Ton, flag Ton is set and flag Toff is reset; and when T>Toff, flag Toff is set and flag Ton is reset. There is also a status bit flag R for system Reset. (Note that the clock status may be coded with two bits, and the temperature status with one bit.) The temperature status is also the parameter which controls the furnace.

The process essentially cycles between two modes of operation: the first or standby mode "Cs" is when the setback temperature is maintained. In this mode, the dwell time of the furnace being turned on and off is monitored, and at the completion of each dwell cycle, a new calculation of the proper time ("Cno") to switch to the operational mode is made. In the second or normal mode, the operational (or normal) temperature is maintained. In this mode, the error in achieving the normal temperature on schedule is calculated. Process control reverts to the setback mode at the programmed time.

Operation of the system will start with a system reset, at block 100 in the flow chart FIG. 3. Reset will occur whenever the user changes any of the settings at the system console 12 of FIG. 1, which causes the memory bit R to be set (=1). The current values of Clock Normal Cn, Clock Setback Cs, Temperature Normal Tn and Temperature Setback Ts are read into memory. Note that the values for the Temperature T and the real Clock time C should be available in registers during execution of the program. The value of the parameter for Clock Normal Offset Cno is set to its default value during the reset step 100.

At step 102, the value for range between normal and setback temperatures is set to Tns=Tn−Ts, the values for Cd1, Cd2, Cd3, Cda, Cdf1 and Cdf2 are all set to a value ((Cn−Cno)/(Tns/Td)). The value for the error compensation Factor F is set to (=1), and the value for the Error ratio Ef is set to (=0).

At a decision block 104, the program will check if the flag Cs is set. If No the program will loop through decision blocks 106 and 108 to check the status conditions Cs and R respectively. If R becomes true, the process goes back to the system reset block 100, or if Cs becomes true it goes to block 110. If the decision at block 104 had been Yes, the flow would have gone directly to block 110. The clock 16 of FIG. 1 is now at the setback time Cs shown in FIG. 2.

At block 110 the flag Cno is checked. Since Cs has just been found to be true, the check of Cno will be "not true" and the flow goes to block 112 to commence the first mode of operation. At this time the status of flag Ton should be "No" and it may be assumed that the Reset flag status is also "No", so the flow will be around a loop of the three decision blocks 110, 112 and 114. The temperature T will normally drop until its value is less than Ton, when the flag Ton will set to cause the program to go to a calculation block 116.

At block 116 the Clock Dwell Begin time value Cdb is set equal to the clock time value C.

$$Cdb (=C) \quad (116)$$

The flow goes to a decision block 118, where a status check of flag Toff will be "No". Status checks at blocks 120 and 122 for reset flag R and Clock Normal Offset status flag Cno will both be "No", so that the program goes around a loop of blocks 118, 120 and 122. The furnace is now running to supply heat, so that the temperature T will rise until it is greater than Toff, at which time the flag Toff will set, so that at block 118 the program branches to a calculation block 124.

At block 124 the Clock Dwell End time value Cde is set equal to the clock time value C.

$$Cde (=C) \quad (124)$$

The next blocks 126 and 127 are for calculation of clock dwell, correction factors and the Clock Normal Offset time required to achieve the normal temperature at the time Cn.

$$Cd3 (=Cd2) \quad (126)$$

$$Cd2 (=Cd1)$$

$$Cd1 (=Cde - Cdb)$$

$$Cda \left( = \frac{Cd1 + 2 + Cd3}{3} \right)$$

$$F \left( = \left( F \times \frac{Cda}{Cdf2} \right) + \left( \frac{\left( Ef \times \frac{Cda}{Cdf1} \right)}{2} \right) \right) \quad (127)$$

$$Cno \left( = Cn - \left( \left( \frac{Tns}{Td} \right) \times Cda \right) \right)$$

$$Cno(\text{corrected}) \left( = Cno + \left( F \times \left( \frac{Tns}{Td} \right) \times Cda \right) \right)$$

After performing the calculations at block 127, the program returns to the decision block 110, and as long as the clock has not reached the Clock Normal Offset time Cno, the process continues to cycle through the first mode while the setback temperature is maintained. In this mode, the dwell time of the furnace being turned on and off is monitored, and at the completion of each dwell cycle, a new calculation of the proper time ("Cno") to switch to the operational mode is made.

The averaging of the three most recent thermostat dwells ("Cda") compensates for any instabilities in the thermal sensor due to convection currents, etc. The error compensation factor "F" tends to correct for non-linearities in the heating system as a whole. It consists of one-half of the ratio or error from the most recent "Cno" calculation, normalized for the current "Cda".

When the clock 16 reaches the Clock Normal Offset time Cno, the program will exit from the first mode at block 110 or 122 and enter the second mode at block 130. In the second mode, the operational (or normal) temperature is maintained, and the error in achieving the normal temperature on time is calculated.

If the normal temperature has not been reached, the status of a flag Tn will be No, so that the flow goes decision blocks 132 and 134 to check for flags Cs and R respectively. With both Cs and R No, the program cycles through a loop of blocks 130, 132 and 134.

When the normal temperature is reached, the program goes from block 130 to a calculation block 135, where the clock normal reached value Cnr is set to the clock time C. The process then goes to a calculation block 136, where the correction factor Ef is calculated, and the Clock Dwell Average Cdf1 at this time of reaching the normal temperature and the most recent previous Cnr are set.

$$Ef \left( = \frac{Cnr - Cn}{Cn - Cno} \right) \quad (136)$$

$$Cdf2 (=Cdf1)$$

$$Cdf1 (=Cda)$$

After completing the calculations at block 136, the program will loop through decision blocks 106 and 108 to check the status Cs and R respectively, as long as both are No. The program reverts to the setback mode at the programmed time Cs, when the status Cs becoming No provides an exit from block 106 to block 110.

Figure 4:
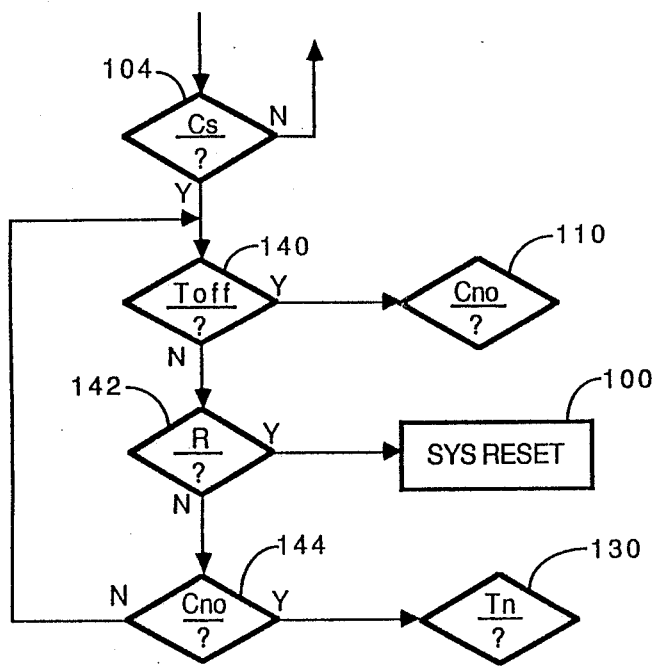
FIG. 4 is a flowchart of a mid cycle reset loop which may be added to the process shown in FIG. 3.

ALTERNATIVES:

As a possible refinement, following a system reset it would be desirable to prevent a calculation of "Cno" on the basis of a clock dwell that began with the reset. A mid-cycle reset loop shown in FIG. 4 may be used as a possible trap for that condition. At the decision block 104, the program checks whether or not the flag Cs is set. If No the operation proceeds to the loop of blocks 106 and 108 as shown in FIG. 3. However, if the decision at block 104 is Yes, instead of going directly to block 110, the process goes to a block 140 to check the status of the Toff flag. If it is set, the process can proceed to the decision block 110 and continue as shown in FIG. 3. If Toff is not true, this indicates that a clock dwell is in progress, and the process enters a loop comprising a decision block 142 for system reset, decision block 134 for the clock normal flag Cno, and back to block 140. If Toff becomes true the program goes to block 110, if a reset occurs the exit is to the system reset block 100, and if the Cno flag becomes set the program goes to block 130. The program then continues as shown in FIG. 3.

Also, it might be desirable to adjust the calculation of "Cno" when the zone temperature fails to reach the temperature "Ton" during the setback period. This could be roughly accomplished by "splitting the difference"; making "Cno"="(Cno/2)" until "Ton" is first reached after the start of the setback mode. Of course, better calculations could be made on the basis of the measured temperature, etc.

Just as the response of the controlled zone to the heating or cooling source being turned on can yield a prediction of the time required to adjust to a new setpoint, so could the response of the zone to the source being turned off (reference the illustrated process control definitions where "Cd1=Cde1−Cdb1", this alternative approach would result in "Cd1=Cdb1−Cde2"). Such observations could yield only relative information, but if combined with sufficiently accurate predictions (or measurements) of the heating or cooling source characteristics, equivalent performance would result.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method of predicting the time required to change the temperature of a zone from a setback temperature to a normal temperature, in a transition from a standby mode to a normal mode, used in a controller for a space conditioning system to modify the temperature of a zone within a structure wherein the system includes a thermal unit which is a bistable or on-off heat source, means for selectively transferring heat between the thermal unit and said zone with a normal mode and a setback mode, wherein the controller includes a system clock and a temperature sensor which measures the temperature in said zone, means providing system operating parameters comprising a normal temperature setting, a setback temperature setting, a clock normal setting and a clock setback setting, wherein during the normal mode the temperature of the zone is to be maintained in a range around the normal temperature at times beginning with the clock normal setting and ending with the clock setback setting, and wherein during the standby mode the temperature of the zone is to be maintained in a range around the setback temperature at times beginning with the clock setback setting and ending with the clock normal setting, with said ranges established by "temperature on" and "temperature off" set-points which control turning the thermal unit on and off, a clock normal offset being used as a time for changing operation to the normal mode in an attempt for the temperature of said zone to reach the normal temperature at the time designated by the clock normal setting; said method comprising the steps:

measuring "clock dwell begin" and "clock dwell end" times indicated by the clock when the "temperature on" and "temperature off" setpoints respectively occur as determined by comparison to readings from said temperature sensor during the standby mode;

calculating a prediction of the amount of time required to adjust the temperature of the zone to the normal temperature using "clock dwell begin" and "clock dwell end" times as determined by said measuring step during the offset mode and using that prediction to set the clock normal offset time for the system to commence operation in the normal mode;

wherein calculating a prediction during the standby mode comprises, following each occurence of "clock dwell begin" followed by "clock dwell end", calculating clock dwell time by subtracting the "clock dwell end" time from the "clock dwell begin" time and using the resulting value to obtain a clock dwell factor which indicates the time required to heat the zone from the "temperature on" setpoint to the "temperature off" set-point, forming a temperature ratio as the range between the normal and setback temperatures divided by the range between the "temperature on" set-point to the "temperature off" set-point, forming a product of the temperature ratio multiplied by the clock dwell factor, subtracting that product from the clock normal setting, and using the result in the prediction to set the clock normal offset time.

2. A method according to claim 1, wherein the clock dwell factor is a clock dwell average (Cda) calculated by adding the N most recent clock dwell times and dividing by N, where N is any positive integer.

3. A method according to claim 2, wherein following entering the normal mode upon reaching the clock normal offset time, and then in response to reaching the normal temperature setting a clock normal reached time (Cnr) equal to the clock time (C), calculating an error ratio (Ef) by taking the difference between the clock normal reached time and the clock normal setting and dividing by the difference between the clock normal setting and the clock normal offset (Ef=(Cnr−Cn)/(Cn−Cno)), setting a first clock dwell average function (Cdf1) to the present clock dwell average (Cda) value, after setting a second clock dwell average function (Cdf2) to the first clock dwell average function from the most recent previous operation in the normal mode;

wherein calculating a prediction during the standby mode includes calculating an error compensation factor (F) with a first term equal to a previous value of the error compensation factor (F) multiplied by the ratio of the clock dwell average (Cda) and the second clock dwell average function (Cdf2), and a second term equal to one half of quantity of the error ratio (Ef) multiplied by the ratio of the clock dwell average divided by the first clock dwell average function (Cdf1), the first term and the second term being added to obtain a new value for the error compensation factor (F=(Fx(Cda/Cdf2))+(Efx((Cda/Cdf1)/2))), and calculating a corrected value for clock normal offset by adding to the previous value thereof a term equal to the error compensation factor (F) multiplied by the ratio of the range between normal and setback temperatures to the range between the "temperature on" and "temperature off" setpoints multiplied by the clock dwell average (Cda)

(Cno corrected=Cno+(Fx(Tns/Td)xCda)):

wherein the means providing system operating parameters is a system console into which a user may enter the parameters comprising the normal temperature setting, the setback temperature setting, the clock normal setting and the clock setback setting, and entering any new value causes a reset flag to be set, wherein the method includes checking the reset flag at various points in the process during both the standby mode and the normal mode and if it is set going to a system reset mode to enter the current values of the parameters and setting the clock normal offset (Cno) to a default value;

wherein the system reset mode further includes setting the N most recent clock dwell times (Cd1, Cd2, Cd3), the clock dwell average (Cda), the first clock dwell average function (Cdf1) and the second clock dwell average function (Cdf2) all equal to the quantity of the clock normal setting minus the clock normal offset divided by the ratio of the range between the normal and setback temperatures to the range between the "temperature on" and "temperature off" values (=(Cn−Cno)/(Tns/Td)); and setting the error compensation factor equal to "one" (F=1), and the error ratio equal to "zero" (Ef=0);

continuing with the standby mode processing if the system is in the standby mode or when it next enters the standby mode.

4. A method of predicting the time required to change the temperature of a zone from a setback temperature to a normal temperature, in a transition from a standby mode to a normal mode, used in a controller for a space conditioning system to modify the temperature of a zone within a structure wherein the system includes a thermal unit which is a bistable or on-off cooling unit, means for selectively transferring heat between the thermal unit and said zone with a normal mode and a setback mode, wherein the controller includes a system clock and a temperature sensor which measures the temperature in said zone, means providing system operating parameters comprising a normal temperature setting, a setback temperature setting, a clock normal setting and a clock setback setting, wherein during the normal mode the temperature of the zone is to be maintained in a range around the normal temperature at times beginning with the clock normal setting and ending with the clock setback setting, and wherein during the standby mode the temperature of the zone is to be maintained in a range around the setback temperature at times beginning with the clock setback setting and ending with the clock normal setting, with said ranges established by "temperature on" and "temperature off" set-points which control turning the thermal unit on and off, a clock normal offset being used as a time for changing operation to the normal mode in an attempt for the temperature of said zone to reach the normal temperature at the time designated by the clock normal setting;

said method comprising the steps:

measuring "clock dwell begin" and "clock dwell end" times indicated by the clock when the "temperature on" and "temperature off" setpoints respectively occur as determined by comparison to readings from said temperature sensor during the standby mode;

calculating a prediction of the amount of time required to adjust the temperature of the zone to the normal temperature using "clock dwell begin" and "clock dwell end" times as determined by said measuring step during the offset mode and using that prediction to set the clock normal offset time for the system to commence operation in the normal mode;

wherein calculating a prediction during the standby mode comprises, following each occurence of "clock dwell begin" followed by "clock dwell end", calculating clock dwell time by subtracting the "clock dwell end" time from the "clock dwell begin" time and using the resulting value to obtain a clock dwell factor which indicates the time required to cool the zone from the "temperature on" set-point to the "temperature off" setpoint, forming a temperature ratio as the range between the normal and setback temperatures divided by the range between the "temperature on" setpoint to the "temperature off" setpoint, forming a product of the temperature ratio multiplied by the clock dwell factor, subtracting that product from the clock normal setting, and using the result in the prediction to set the clock normal offset time.

5. A method according to claim 4, wherein the clock dwell factor is a clock dwell average (Cda) calculated by adding the N most recent clock dwell times and dividing by N, where N is any positive integer.

6. A controller for a space conditioning system to modify the temperature of a zone within a structure wherein the system includes a thermal unit which is a bistable or on-off heat source, means for selectively transferring heat between the thermal unit and said zone with a normal mode and a setback mode, wherein the controller includes a system clock and a temperature sensor which measures the temperature in said zone, means providing system operating parameters comprising a normal temperature setting, a setback temperature setting, a clock normal setting and a clock setback setting, wherein during the normal mode the temperature of the zone is to be maintained in a range around the normal temperature at times beginning with the clock normal setting and ending with the clock setback setting, and wherein during the standby mode the temperature of the zone is to be maintained in a range around the setback temperature at times beginning with the clock setback setting and ending with the clock normal setting, with said ranges established by "temperature on" and "temperature off" setpoints which control turning the thermal unit on and off, a clock normal offset being used as a time for changing operation to the normal mode in an attempt for the temperature of said zone to reach the normal temperature at the time designated by the clock normal setting;

means for predicting the time required to change the temperature of the zone from the setback temperature to the normal temperature, in a transition from the standby mode to the normal mode, comprising:
   means for measuring "clock dwell begin" and "clock dwell end" times indicated by the clock when the "temperature on" and "temperature off" setpoints respectively occur as determined by comparison to readings from said temperature sensor during the standby mode;
   means for calculating a prediction of the amount of time required to adjust the temperature of the zone to the normal temperature using "clock dwell begin" and "clock dwell end" times as determined by said measuring step during the offset mode and using that prediction to set the clock normal offset time for the system to commence operation in the normal mode;
   wherein the means for calculating a prediction during the standby mode comprises means effective following each occurence of "clock dwell begin" followed by "clock dwell end" for calculating clock dwell time by subtracting the "clock dwell end" time from the "clock dwell begin" time and using the resulting value to obtain a clock dwell factor which indicates the time required to heat the zone from the "temperature on" set-point to the "temperature off" set-point, means for forming a temperature ratio as the range between the normal and setback temperatures divided by the range between the "temperature on" set-point to the "temperature off" setpoint, means for forming a product of the temperature ratio multiplied by the clock dwell factor, means for subtracting that product from the clock normal setting, and using the result in the prediction to set the clock normal offset time.

7. A controller according to claim 6, wherein the clock dwell factor is a clock dwell average (Cda) calculated by means for adding the N most recent clock dwell times and dividing by N, where N is any positive integer.

8. A controller for a space conditioning system to modify the temperature of a zone within a structure wherein the system includes a thermal unit which is a bistable or on-off cooling unit, means for selectively transferring heat between the thermal unit and said zone with a normal mode and a setback mode, wherein the controller includes a system clock and a temperature sensor which measures the temperature in said zone, means providing system operating parameters comprising a normal temperature setting, a setback temperature setting, a clock normal setting and a clock setback setting, wherein during the normal mode the temperature of the zone is to be maintained in a range around the normal temperature at times beginning with the clock normal setting and ending with the clock setback setting, and wherein during the standby mode the temperature of the zone is to be maintained in a range around the setback temperature at times beginning with the clock setback setting and ending with the clock normal setting, with said ranges established by "temperature on" and "temperature off" setpoints which control turning the thermal unit on and off, a clock normal offset being used as a time for changing operation to the normal mode in an attempt for the temperature of said zone to reach the normal temperature at the time designated by the clock normal setting;

means for predicting the time required to change the temperature of the zone from the setback temperature to the normal temperature, in a transition from the standby mode to the normal mode, comprising:
   means for measuring "clock dwell begin" and "clock dwell end" times indicated by the clock when the "temperature on" and "temperature off" setpoints respectively occur as determined by comparison to readings from said temperature sensor during the standby mode;
   means for calculating a prediction of the amount of time required to adjust the temperature of the zone to the normal temperature using "clock dwell begin" and "clock dwell end" times as determined by said measuring step during the offset mode and using that prediction to set the clock normal offset time for the system to commence operation in the normal mode;
   wherein the means for calculating a prediction during the standby mode comprises means effective following each occurence of "clock dwell begin" followed by "clock dwell end" for calculating clock dwell time by subtracting the "clock dwell end" time from the "clock dwell begin" time and using the resulting value to obtain a clock dwell factor which indicates the time required to cool the zone from the "temperature on" set-point to the "temperature off" set-point, means for forming a temperature ratio as the range between the normal and setback temperatures divided by the range between the "temperature on" set-point to the "temperature off" set-point, means for forming a product of the temperature ratio multiplied by the clock dwell factor, means for subtracting that product from the clock normal setting, and using the result in the prediction to set the clock normal offset time.

9. A controller according to claim 8, wherein the clock dwell factor is a clock dwell average (Cda) calculated by means for adding the N most recent clock dwell times and dividing by N, where N is any positive integer.

* * * * *